Sept. 26, 1939.  P. G. SCHWEIGHART  2,174,332
SEWER TRAP
Filed Oct. 3, 1938
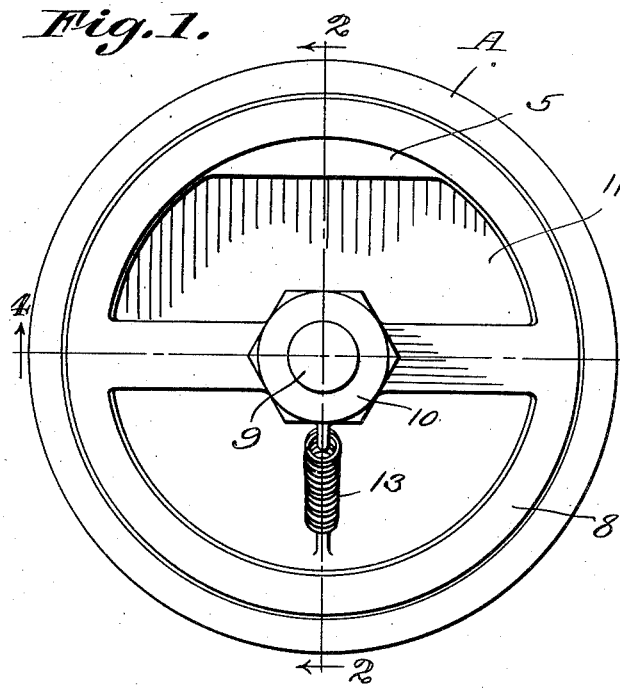
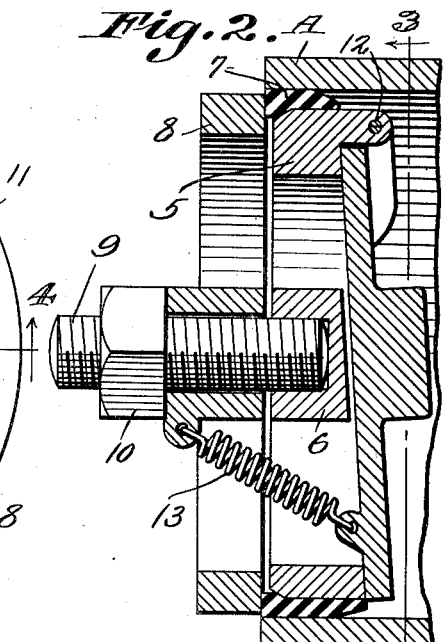
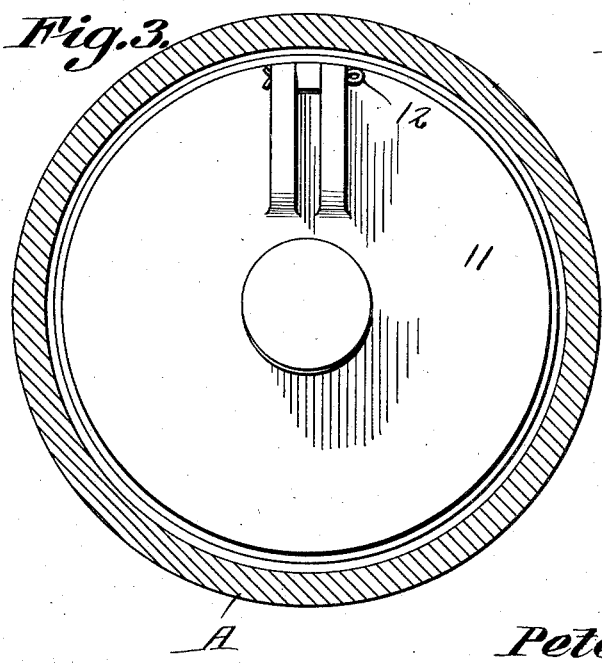
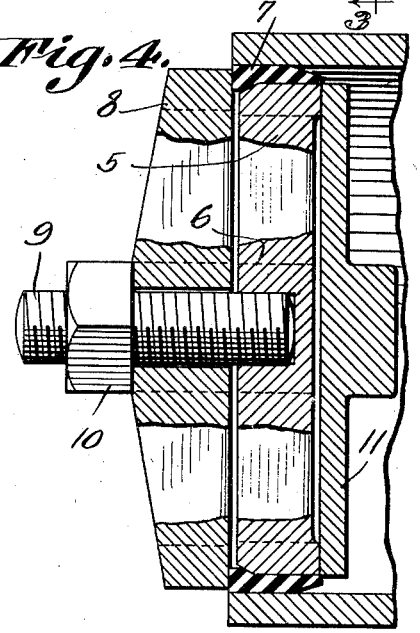
Peter Schweighart
INVENTOR.
BY CA Snow Co.
ATTORNEYS.

Patented Sept. 26, 1939

2,174,332

UNITED STATES PATENT OFFICE 2,174,332

SEWER TRAP

Peter G. Schweighart, Sandusky, Ohio

Application October 3, 1938, Serial No. 233,092

2 Claims. (Cl. 182—25)

This invention relates to sewer traps, the primary object of the invention being to provide a sewer trap which may be readily and easily installed, and one which will insure a gas-tight connection between the trap and pipe in which it is positioned.

An important object of the invention is to provide a sewer trap which may be used in either an inclined or horizontal position, with assurance of the operation of the closure at all times.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a front elevational view of a sewer trap constructed in accordance with the invention.

Figure 2 is a sectional view taken on line 2—2 of Figure 1.

Figure 3 is a sectional view taken on line 3—3 of Figure 2.

Figure 4 is a sectional view taken on line 4—4 of Figure 1.

Referring to the drawing in detail, the body portion is indicated by the reference character 5, and as shown, the body portion is provided with a bar 6, formed with a threaded bore. The body portion 5 is of a diameter appreciably less than the diameter of the pipe in which the trap is positioned. Fitted between the body portion 5 and the pipe in which it is positioned and which is indicated by the reference character A, is a gasket 7 formed with a beveled wall, so that as the body portion 5 is moved over the beveled wall, the gasket will become wedged between the wall of the pipe A and body portion 5.

Cooperating with the body portion 5, is the spider 8 which is of a diameter less than the pipe so that the spider may move against the gasket 7 to prevent the gasket from being forced too far outwardly as the body portion is being positioned. This spider 8 is provided with an opening through which the bolt 9 operates, which bolt moves into the threaded bore of the body portion, so that when the nut 10, which is positioned on the bolt 9 is rotated, the body portion 5 and spider 8 will be drawn together, expanding the gasket 7 into engagement with the pipe A, securing the body portion in position.

As shown, the inner edge of the body portion 5 is recessed, providing a seat for the closure 11 which is hingedly connected to the body portion at 12, the recess or seat being formed in such a way that the closure 11 is inclined to cause the closure to gravitate to its closed position under normal conditions, but swing to its open position under pressure directed against the closure in the opposite direction.

In order that the trap may be used in a vertical position, a coiled spring 13 is provided, the coiled spring having one of its ends secured to the spider 8, the opposite end thereof being secured to the closure 11 to draw the closure to its closed position.

From the foregoing it will be seen that due to the construction shown and described, the closure will swing to its open position under pressure in one direction and return to its closed position under pressure in the opposite direction to exclude back pressure and sewer gas.

In view of the foregoing detail description, a further detail description as to the operation of the trap is believed unnecessary.

I claim:

1. A sewer trap comprising a body portion adapted to be fitted in a pipe, said body portion being of a diameter appreciably less than the pipe in which the body portion is positioned, said body portion having a threaded opening, a tapered gasket fitted between the body portion and wall of the pipe, a spider greater in diameter than the body portion and adapted to engage the outer end of the gasket, a bolt extending through the spider and positioned in the threaded opening of the body portion, said bolt adapted to draw the body portion and spider together, said spider adapted to bear against the gasket expanding the gasket into close engagement with the pipe in which the body portion is positioned, and a pivoted closure mounted on the body portion.

2. A sewer trap comprising a body portion adapted to be positioned in a pipe, said body portion being of a diameter appreciably less than the pipe in which the body portion is positioned, said body portion having a threaded opening, a tapered gasket fitted between the body portion and wall of the pipe, a spider of a diameter greater than the body portion and adapted to engage one end of the gasket, a bolt extending through the spider, the inner end of said bolt being fitted in the threaded opening of the body portion, a nut on said bolt and engaging the spider, said nut adapted to draw the spider and body portion together when the nut is rotated in one direction, said spider adapted to expand the gasket into close engagement with the wall of the pipe, a pivoted closure mounted on the body portion, a coiled spring connected with the closure and having one end thereof connected with the spider normally holding the closure to its closed position and said closure adapted to move from its seat under pressure passing through the pipe in one direction.

PETER G. SCHWEIGHART.